United States Patent [19]
Theodorou

[11] Patent Number: 6,036,398
[45] Date of Patent: Mar. 14, 2000

[54] EXTRUDED FRAME MEMBER FOR STRUCTURAL CONNECTION AND METHOD OF FORMING SAME

[76] Inventor: Antonis Theodorou, 737 Danielle Ct., Sleepy Hollow, Ill. 60118

[21] Appl. No.: 09/102,407

[22] Filed: Jun. 22, 1998

[51] Int. Cl.[7] ........................................ F16B 2/04
[52] U.S. Cl. .................... 403/292; 403/290; 403/302; 403/319
[58] Field of Search .................... 403/292, 294, 403/295, 297, 298, 300, 301, 302, 309, 310, 311, 313, 318, 319, 326, 329, 354, 289, 290; 52/586.2, 586.1, 582.1, 590.1, 592.1

[56] References Cited

U.S. PATENT DOCUMENTS

| | | | |
|---|---|---|---|
| 3,452,584 | 7/1969 | Jones | 403/326 X |
| 3,485,519 | 12/1969 | Chiu | 403/289 X |
| 3,712,005 | 1/1973 | Eschbach et al. . | |
| 3,719,378 | 3/1973 | Windsor | 403/354 X |
| 3,760,547 | 9/1973 | Brenneman | 403/292 X |
| 3,811,785 | 5/1974 | Hagglund . | |
| 4,042,307 | 8/1977 | Jarvis | 403/290 |
| 4,485,597 | 12/1984 | Worrallo . | |
| 4,549,832 | 10/1985 | Sterl . | |
| 4,599,837 | 7/1986 | Wrightman | 403/297 X |
| 4,701,066 | 10/1987 | Beam et al. | 403/298 |
| 5,247,773 | 9/1993 | Weir . | |
| 5,476,699 | 12/1995 | Hurvitz et al. . | |

*Primary Examiner*—Harry C. Kim
*Attorney, Agent, or Firm*—Meroni & Meroni; Charles F. Meroni, Jr.

[57] ABSTRACT

A fastener structure which allows for connecting a first connector member to a second connector member, the second connector member having a slot for receiving the first connector member. The first connector member has a pair of generally parallel, relatively stiff, yieldable legs that are spaced apart a distance substantially equivalent to a width of the slot. The slot has an open end defined by confronting spaced apart sidewalls. The yieldable legs have outwardly forming cam surfaces that are sized and shaped for camming engagement with the confronting spaced apart sidewalls, thus causing the yieldable legs to yield towards one another as the first connector member is pushed into the slot in the second connector member. The yieldable legs have oppositely facing locking abutments, the slot sidewalls have notched areas spaced inwardly from the open end of the slot for receiving the locking abutments to secure the yieldable legs in a secured fitted position in the slot with the yieldable legs being formed and shaped to exert forces to hold the locking abutments in the notched areas. The fastener structure further includes a lock key member that is slideable longitudinally between the yieldable legs and is engageable with confronting inner faces of the yieldable legs to further secure the locking abutments of the yieldable legs in the notched areas.

11 Claims, 10 Drawing Sheets

EXTRUDED FRAME MEMBER FOR STRUCTURAL CONNECTION AND METHOD OF FORMING SAME

BACKGROUND OF THE INVENTION

1. Field of the Invention

The present invention relates generally to a new and improved method and apparatus for forming frame structures. More specifically the present invention provides a universal type of structural connector that is an integral part of a framing member with standardized outside dimensions, generally replicating dimensional lumber. The invention allow a user to quickly assemble and disassemble simple or complex frame structures using my prefabricated frame members with built-in connectivity.

2. Description of the Prior Art

In the past, it has been the practice for users to insert various connectors as "hardware", into machined or otherwise prepared framing members at the time of the application. Although this practice promotes and maintains the standardization of the basic shapes of framing members, such as dimensional lumber, and it requires machining or some other adaptation in order to integrate the connectors. Furthermore, the connectors are typically stand-alone parts, not necessarily designed as a system with the framing members.

Also in the past, specialized framing members have been developed, where the connectivity features were an integral part of the framing member, typically in a male to female order. In this case, one sacrifices universality of the basic shapes by creating more categories of parts, in order to gain the advantage of "no-machining".

There have been various types of connectors and framing structures available in the marketplace, but none have gained widespread acceptance because of their expense, difficulty of use, lack of universal use and inability for quick assembly and disassembly.

These and other types of connectors and frame members used in the past do not offer the flexibility, universality and productivity derived from the inventive features of my structure connector. As will be described in greater detail hereinafter, the method and apparatus of the structural connector of the present invention differs from those previously proposed.

SUMMARY OF THE INVENTION

According to my present invention I have provided a fastener structure which allows for connecting a first connector member to a second connector member, the second connector member having a slot for receiving the first connector member. The first connector member has a pair of generally parallel, relatively stiff, yieldable legs that are spaced apart a distance substantially equivalent to a width of the slot. The slot has an open end defined by confronting spaced apart sidewalls. The yieldable legs have outwardly forming cam surfaces that are sized and shaped for camming engagement with the confronting spaced apart sidewalls, thus causing the yieldable legs to yield towards one another as the first connector member is pushed into the slot in the second connector member. The yieldable legs have oppositely facing locking abutments, the slot sidewalls have notched areas spaced inwardly from the open end of the slot for receiving the locking abutments to secure the yieldable legs in a secured fitted position in the slot with the yieldable legs being formed and shaped to exert forces to hold the locking abutments in the notched areas. The fastener structure further includes a lock key member that is slideable longitudinally between the yieldable legs and is engageable with confronting inner faces of the yieldable legs to further secure the locking abutments of the yieldable legs in the notched areas.

I have further provided a fastener structure as described above, wherein the first connector member and/or the second connector member and/or the lock key member are made of an extruded material such as plastic and aluminum.

Still another feature of my invention concerns the fastener structure as described above, wherein the lock key member is comprised of a piece of flexible tubing. The flexible tubing allows a user to insert a screw at one end in order to pull the flexible tubing out from in between the yieldable legs. The flexible tubing is also coilable in order to reduce the amount of space required to insert and remove the flexible tubing from in between the yieldable legs.

Still yet another feature of my invention concerns the fastener structure as described above, wherein the second connector member is a structural frame member having a generally rectangular shape.

Yet another feature of my invention concerns the fastener structure as described above, wherein the second connector member contains at least one slot on its perimeter extending along the length of the second connector member.

A still further feature of my invention concerns the fastener structure as described above, wherein the first connector member further includes a filler. The filler is positioned at an upper portion between the yieldable legs and has a flat outer surface. The flat outer surface is sized to be flush with an outer surface of the second connector member adjacent the slot when the first connector member is positioned within the slot of the second connector member and the lock key member is positioned in between the yieldable legs.

An even further feature of my invention concerns the fastener structure as described above, wherein the first connector member further includes an adapter. The adapter is positioned at an upper portion between the yieldable legs and has at least one groove extending along the length of the first connector member on an outer portion thereof. The groove or grooves can be used to hold at least one piece of material in place.

Yet still another feature of my invention concerns the fastener structure as described above, wherein the first connector member further includes an extension. The extension is positioned at an upper portion between the first pair of yieldable legs and extends outwardly away from the yieldable legs. The extension has a second pair of generally parallel, relatively stiff, yieldable legs at an opposite end of the first connector member. The second pair of yieldable legs are sized and shaped similarly to the first pair of yieldable legs, wherein the second pair of yieldable legs allow for connection to a third connector member that has a slot for receiving the second pair of yieldable legs.

According to other features in invention I have provided a fastener structure as described above, wherein the extension is angled between 0 degrees and 120 degrees relative to a vertical axis of the first pair of yieldable legs in order to allow for various different types of structural configurations.

Still yet another feature of my inventions involves the fastener structure as described above, wherein the first connector member further includes a channel, the channel is centrally located at an upper portion in between the yieldable legs, so as to act as a guide for inserting the lock key member as well as providing a marked area of an axially center portion of the first connector member.

Still another feature of my invention concerns the method for connecting at least two connector members together. The method comprises the steps of: a) providing a first connector member, the first connector member having a pair of generally parallel, relatively stiff, yieldable legs; b) providing a second connector member having a slot for receiving the first connector member, the yieldable legs of the first connector member being spaced apart a distance substantially equivalent to a width of the slot, the slot having an open end defined by confronting spaced apart sidewalls, the yieldable legs having outwardly forming cam surfaces which are sized and shaped for camming engagement with the confronting spaced apart sidewalls, the yieldable legs having oppositely facing locking abutments, the slot sidewalls having notched areas spaced inwardly from the open end of the slot for receiving the locking abutments; c) pushing the first connector member into the slot of the second connector member, thus causing the yieldable legs to initially yield towards one another as the first connector member is pushed into the slot in the second connector member and then causing the locking abutments to enter the notched areas, wherein the yieldable legs are formed and shaped to exert forces to hold the locking abutments in the notched areas; d) providing a lock key member sized to securely fit in between the pair of yieldable legs of the first connector member; and e) sliding the lock key member longitudinally between the yieldable legs, wherein the lock key member is sized to be in engagement with confronting inner faces of the yieldable legs to further secure the locking abutments of the yieldable legs in the notched areas, and thereby connecting at least two connector members together.

Other objects, features and advantages of my invention will become more readily apparent upon reference to the following description when taken in conjunction with the accompanying drawings, which drawings illustrate several embodiments of my invention.

DETAILED DESCRIPTION OF THE PREFERRED EMBODIMENT

Figure 1:
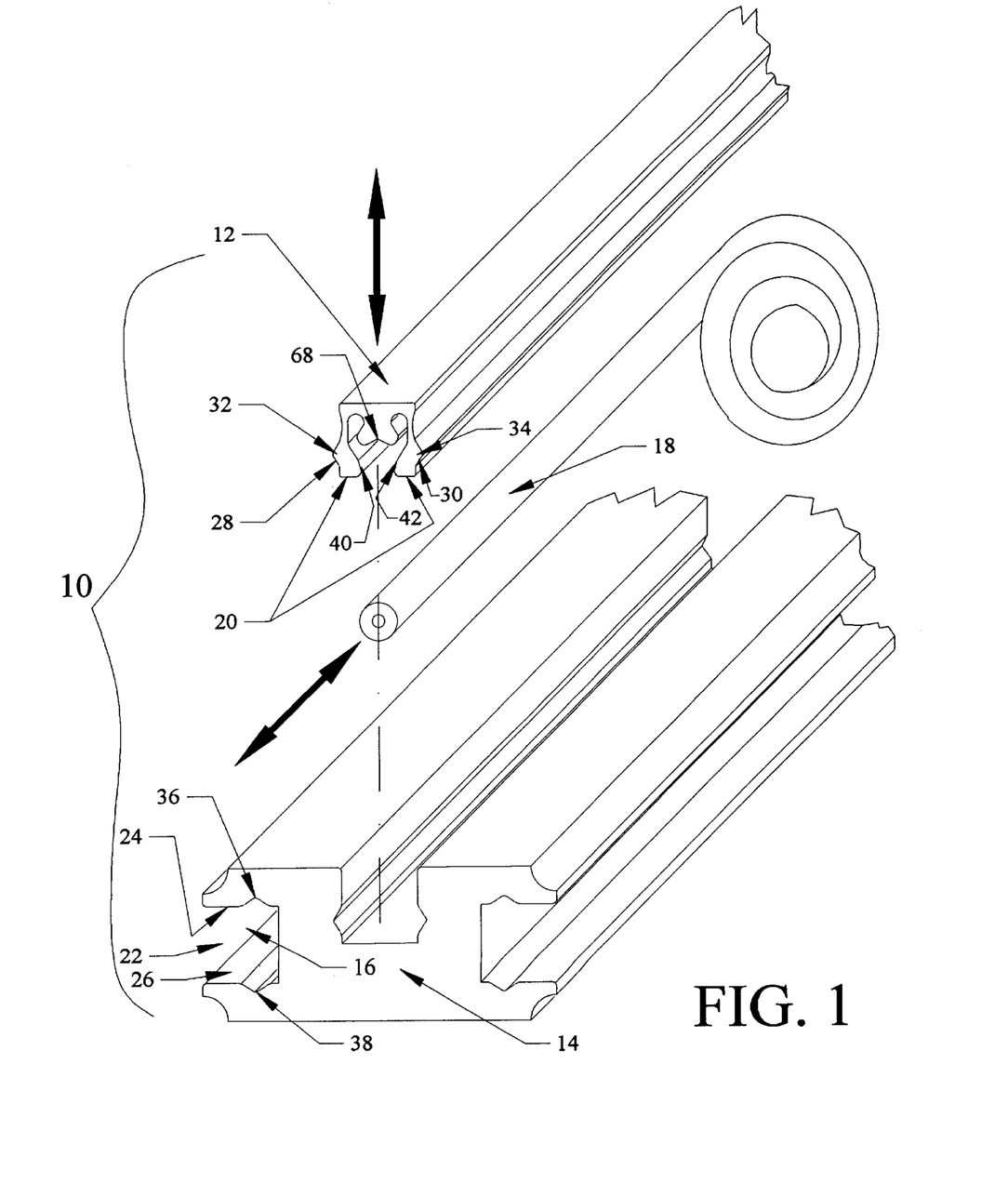
FIG. 1 is an enlarged exploded partial perspective view of my fastener structure embodying important features of my invention.
Figure 2:
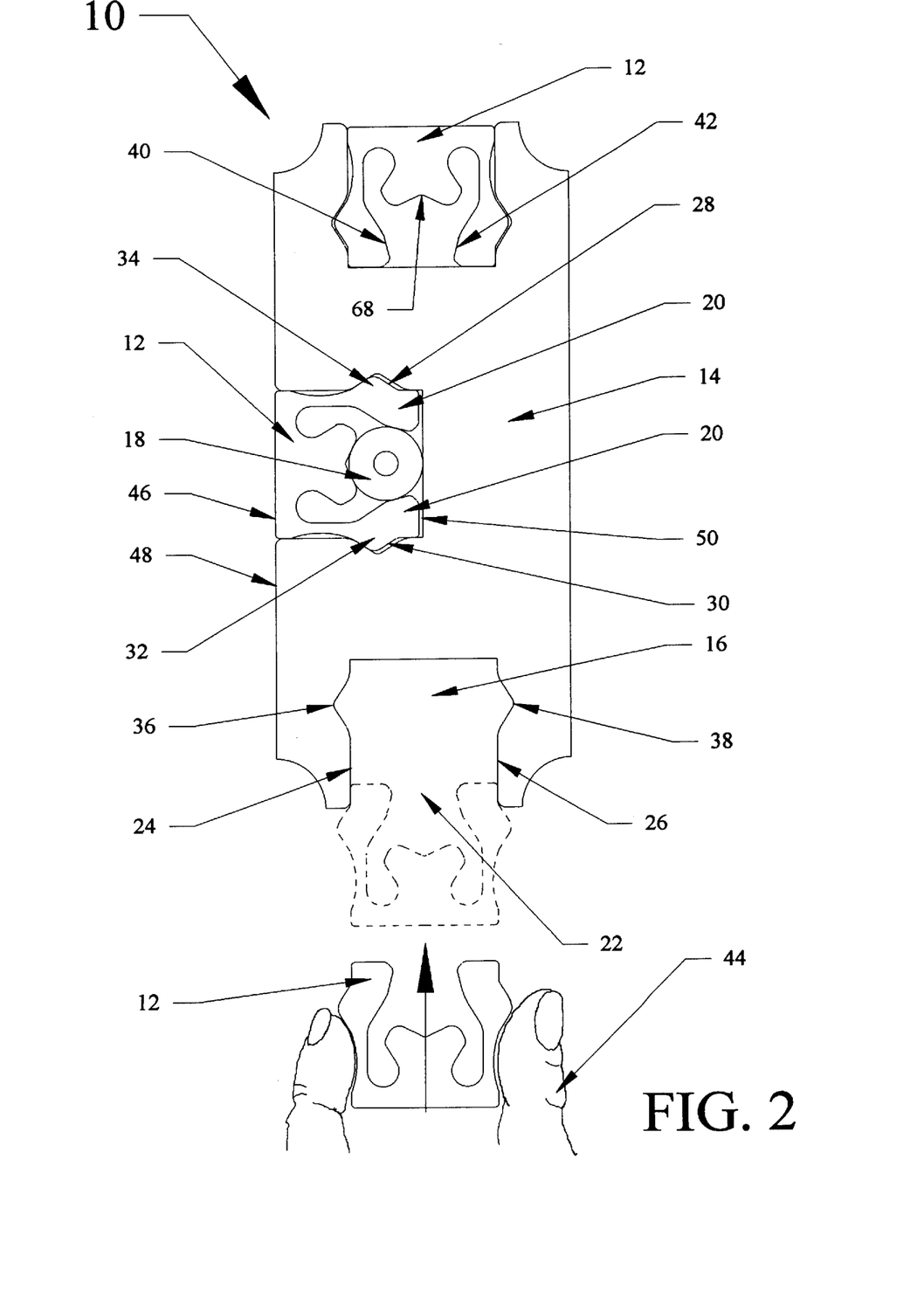
FIG. 2 is an enlarged end view of my fastener structure illustrating the way in which my fastener structure works.
Figure 3:
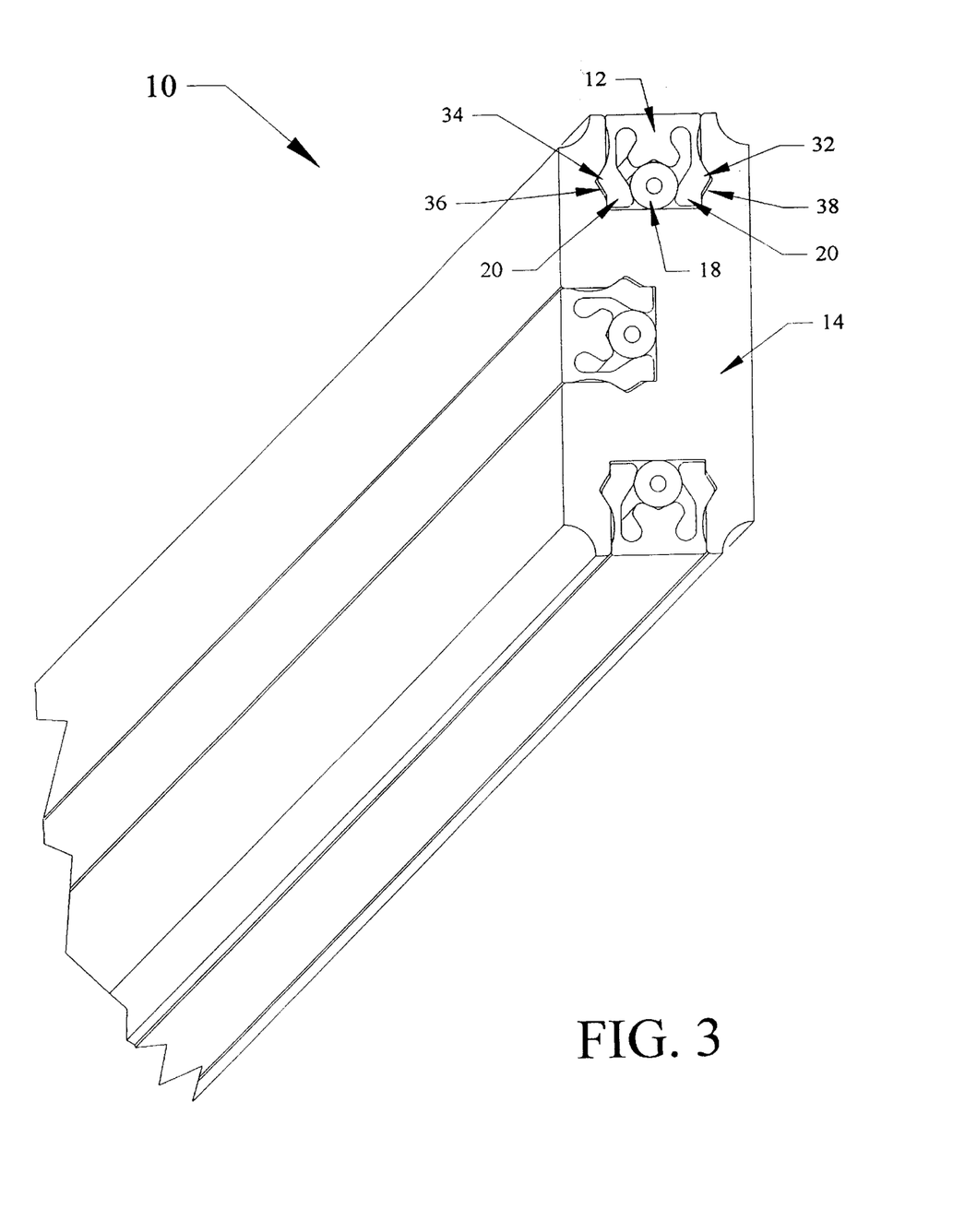
FIG. 3 is a partial perspective view of my fastener structure.

Referring now to the drawings, FIGS. 1–3 show my new and improved fastener structure 10. The fastener structure can be used to connect with various different types of other structures, as will be described in greater detail herein, quickly and easily, as well as allowing the fastener structure to be quickly and easily disassembled.

My fastener structure 10 is comprised of a male connector member or a first connector member 12 that connects to a female connector member or a second connector member 14 having at least one slot 16 sized for receiving the first connector member 12, wherein the first connector member 12 is held in place within the slot 16 of the second connector member 14 with a tube or a lock key member 18. The second connector member 14 shown in the drawings has generally a 2×4 rectangular shape, however, the second connector member can be made in a variety of different sizes and dimensions that are suitable for frame construction purposes. The slot 16 generally extends along the length of the second connector member 14, furthermore the second connector member 14 can have multiple slots extending about its perimeter in order to provide a more universal connector. The first connector member 12 has a pair of generally parallel, relatively stiff, but bendable or yieldable legs 20 that are spaced apart a distance substantially equivalent to a width of the slot 16. Excellent results can be obtained when the first connector member 12 and the second connector member 14 are made of an extruded plastic or an extruded aluminum. Other types of appropriate materials can also be used to provide the same characteristics of the present invention.

The slot 16 has an open end 22 that is defined by confronting spaced-apart sidewalls 24, 26. The yieldable legs 20 are designed to have outwardly forming cam surfaces 28, 30 that are sized and shaped for camming engagement with the confronting spaced apart sidewalls 24, 26, thereby causing the yieldable legs 20 to bend or yield towards one another as the first connector member 12 is pushed into the slot 16 in the second connector member 14.

The yieldable legs 20 are further defined by having oppositely facing locking abutments 32, 34. The sidewalls 24, 26 are further defined by having notched areas 36, 38 that are spaced inwardly from the open end 22 of the slot 16 for receiving the locking abutments 32, 34, and to secure the yieldable legs 20 in a secured fitted position in the slot 16 with the yieldable legs 20 being formed and shaped to exert forces outwardly against the sidewalls 24, 26 to hold the locking abutments 32, 34 in the notched areas 36, 38.

In order to securely fasten the first connector member 12 to the second connector member 14, a tube or a lock key member 18 is slideable longitudinally between the yieldable legs 20 and is engageable with confronting inner faces 40, 42 of the yieldable legs 20 to fully secure the locking abutments 32, 34 within the notched areas 36, 38. Excellent results can be obtained when the tube or lock key member 18 is made of a material such as extruded plastic, extruded aluminum, or nylon. Other types of appropriate materials could also be used. It is also contemplated that the lock key member 18 be also flexible and coilable to allow room for a user to insert and remove the lock key member 18 in areas that do not provide very much room to assemble a frame structure. Furthermore, it is desirable for the tube or lock key member 18 to have a hole extending therethrough, whereby one can easily remove the lock key member 18 from in between the yieldable legs 20 by screwing a screw into the hole on the end of the lock key member 18 and then pulling on the screw to remove the lock key member 18 out from in between the yieldable legs 20.

The method of attaching and securing the first connector member 12 to the second connector member 14 is fairly quick and easy. As shown in FIG. 2, the first connector member 12 can be snapped in or pushed by a users fingers 44 into the slot 16 of the second connector member 14, thus causing the yieldable legs 20 to initially yield towards one another as the first connector member 12 is pushed into the slot 16 and then causing the locking abutments 32, 34 to enter the notched areas 36, 38. After the first connector member 12 is pushed in place within the slot 16, a user can then slide a tube or lock key member 18 long longitudinally between the yieldable legs 20, wherein the lock key member 18 is sized to be in engagement with confronting inner faces 40, 42 of the yieldable legs 20 to further secure the locking abutments 32, 34 in the notched areas 36, 38, and thereby creating a locked assembly of two connector members 12, 14.

When the lock key member 18 is not inserted in between the yieldable legs 20, the cam surfaces 28, 30 on the locking abutments 32, 34 allow the first connector member 12 to easily snap in and snap out of the slot 16 of the second connector member 14. However, when the lock key member 18 is securely positioned between the yieldable legs 20, the tightly secured position of the locking abutments 32, 34 within the notched areas 36, 38 due to the force and lift exerted by the lock key member 18 prohibits the first connector member 12 from coming out or snapping out from the slot 16.

In order to make the fastener structure of the present invention universal so that many different types of framing structures can be developed, I have provided a variety of different types of adapters in order to allow flexibility in any type of appropriate frame construction. One such adapter is shown in FIG. 2, wherein the first connector member 12 is a filler for filling an unused slot of a second connector member. The filler 12 has a flat outer surface 46, wherein the flat outer surface is sized to be flush with an outer surface 48 of the second connector member 14 adjacent the slot 16 when the first connector member 12 is positioned within the slot the lock key member 18 is positioned in between the yieldable legs 20. As an additional design feature, the first connector member 12 is sized so that the height of the filler 12 is slightly less than the depth of the slot 16, and when the lock key member 18 is pushed into place, the lock key member then lifts the filler 12 so that the locking abutments 32, 34 are securely locked within the notched areas 36, 38 and the flat outer surface 46 of the filler is flush with the outer surface 48 of the second connector member 14. As can be seen in FIG. 2, a small gap 50 is present when the lock key member 18 is secured between the yieldable legs 20. This same small gap appears as a step between the flat outer surface of the filler and the outer surface of the second connector member when the lock key member is not inserted in between the yieldable legs. This feature can be used as a safety check to allow users to quickly know if the connector is locked in place or if it can snap out.

Figures 4, 5:
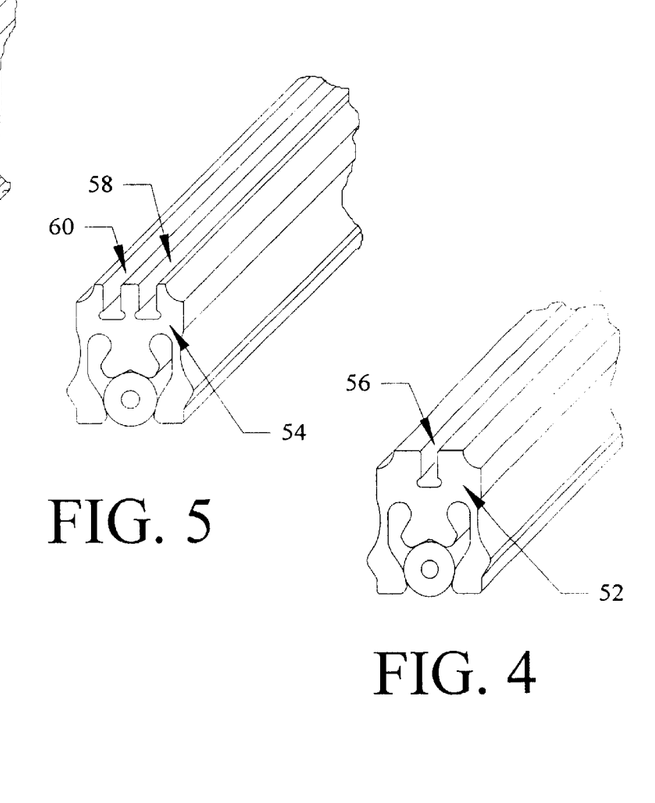
FIG. 4 is a partial perspective view of one type of connector having a groove on one end for holding a piece of material that can be used with my fastener structure.
FIG. 5 is a partial perspective view of another type of connector having two grooves for holding two pieces of material that can be used with my fastener structure.

Another type of adapter that I have developed is a first connector member 52, 54 (FIGS. 4, 5) having at least one groove 56, 58, 60 positioned at an upper portion between the yieldable legs. The grooves 56, 58, 60 extend along the length of the first connector member on an outer portion thereof, and are designed to hold at least one piece of material in place such as glass, plywood, plastic, and other types of appropriate panels. The grooves can be made to have varying widths to accommodate various different types of inserts.

Figure 9:
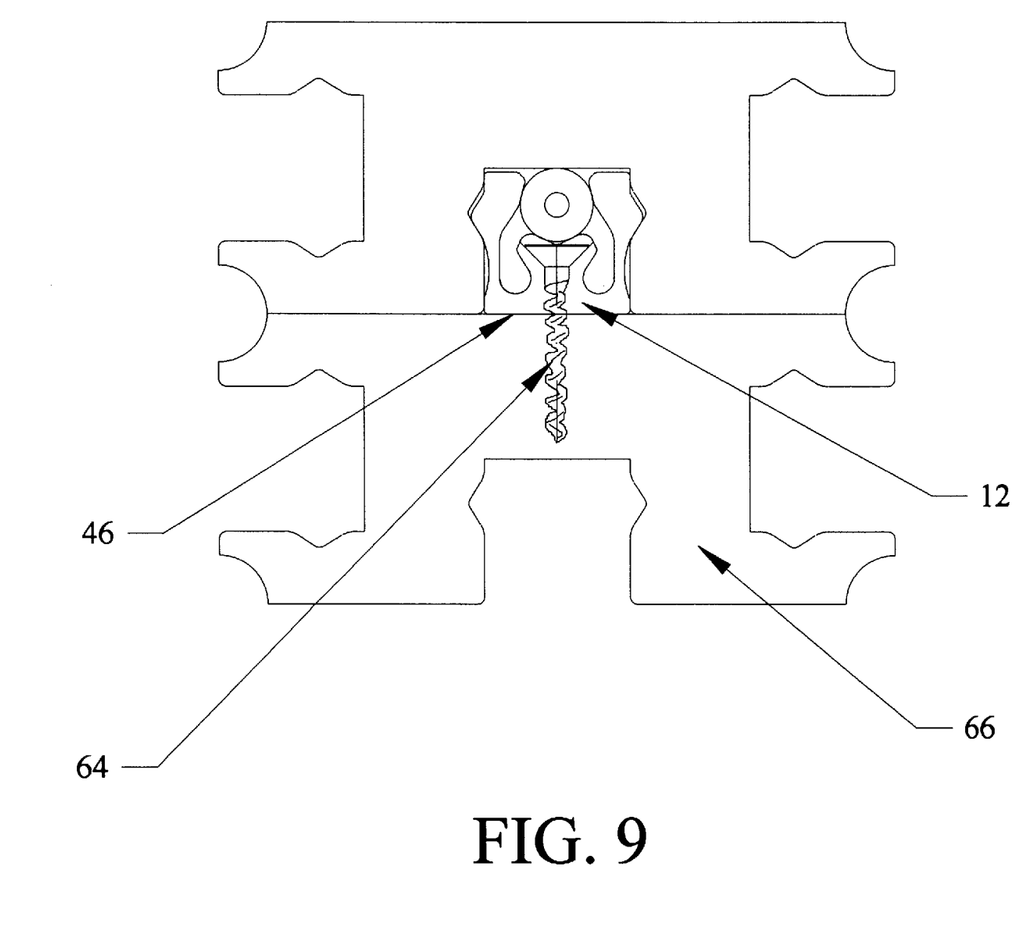
FIG. 9 is an enlarged end view illustrating one way that two frame members can be connected together.
Figures 10, 12:
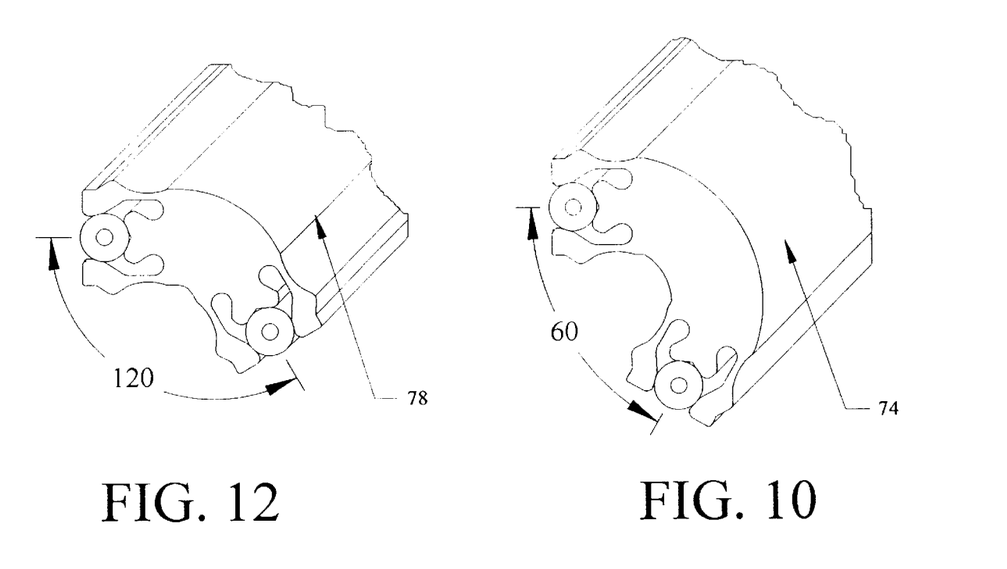
FIG. 10 is a partial perspective view of a connector being angled 60 degrees.
FIG. 12 is a partial perspective view of a connector being angled 120 degrees.
Figure 11:
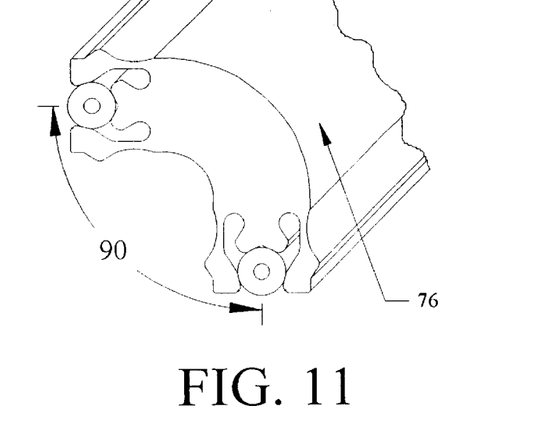
FIG. 11 is a partial perspective view of a connector being angled 90 degrees.
Figure 13:
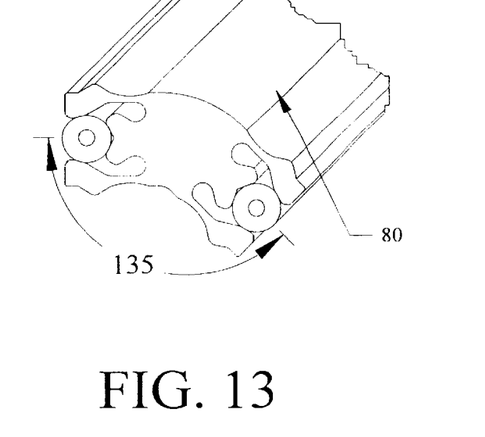
FIG. 13 is a partial perspective view of a connector being angled 135 degrees.

The flat outer surface 46 of the filler connector member 12 (FIGS. 7 and 9) can be attached to other surfaces in a variety of different ways. One way is to just apply glue 62 to the outer surface of the filler connector member 12 and adhesively secure the filler connector member 12 to an opposing surface. Another method of securing the filler connector member 12 is to pass a screw 64 through the filler connector 12 from the inside portion of the filler connector. The screw 64 can then securely hold the filler connector member 12 to an opposing surface 66. In order to keep the screw 64 from interfering with the lock key member 18, a centrally located channel 68 (FIGS. 1 and 2) has been positioned within the male connector member 12 at an upper portion thereof. This centrally located channel 68 has multiple purposes: 1) it helps to feed and hold the lock key member 18 in between the yieldable legs 20; 2) it allows a user to quickly place a screw into the channel in a centrally located position and providing a quick and instant exact alignment of the screw; and 3) it provides room to hold shavings that would be left over from screwing in screws, wherein the shaving would not interfere with the quick insertion of the lock key member 18.

Figures 6, 7:
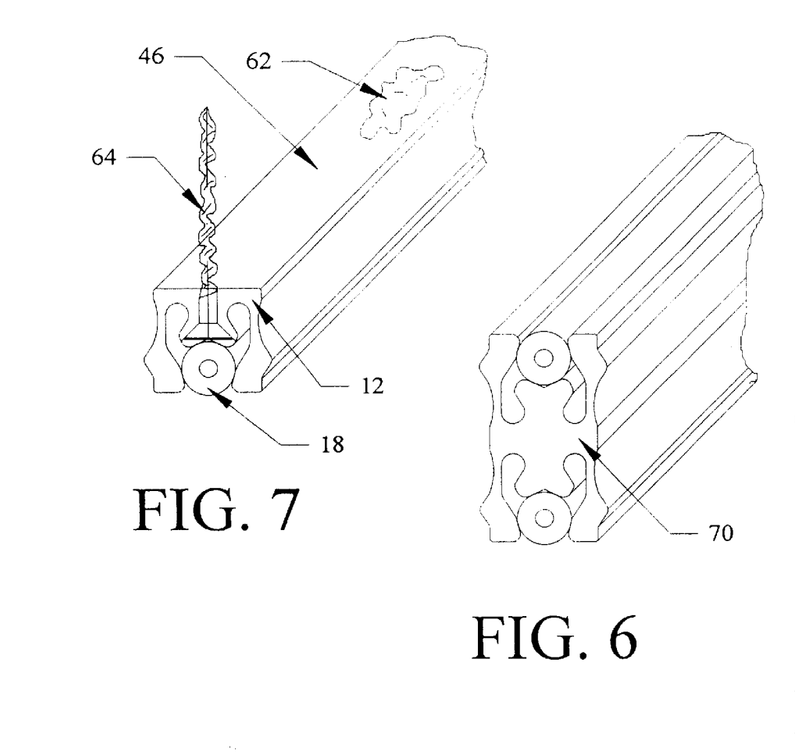
FIG. 6 is a partial perspective view of yet another type of connector that can be used in connecting two frame members together.
FIG. 7 is a partial perspective view illustrating how my flat filler connector can be attached to an opposing surface with screws or glue.
Figure 8:
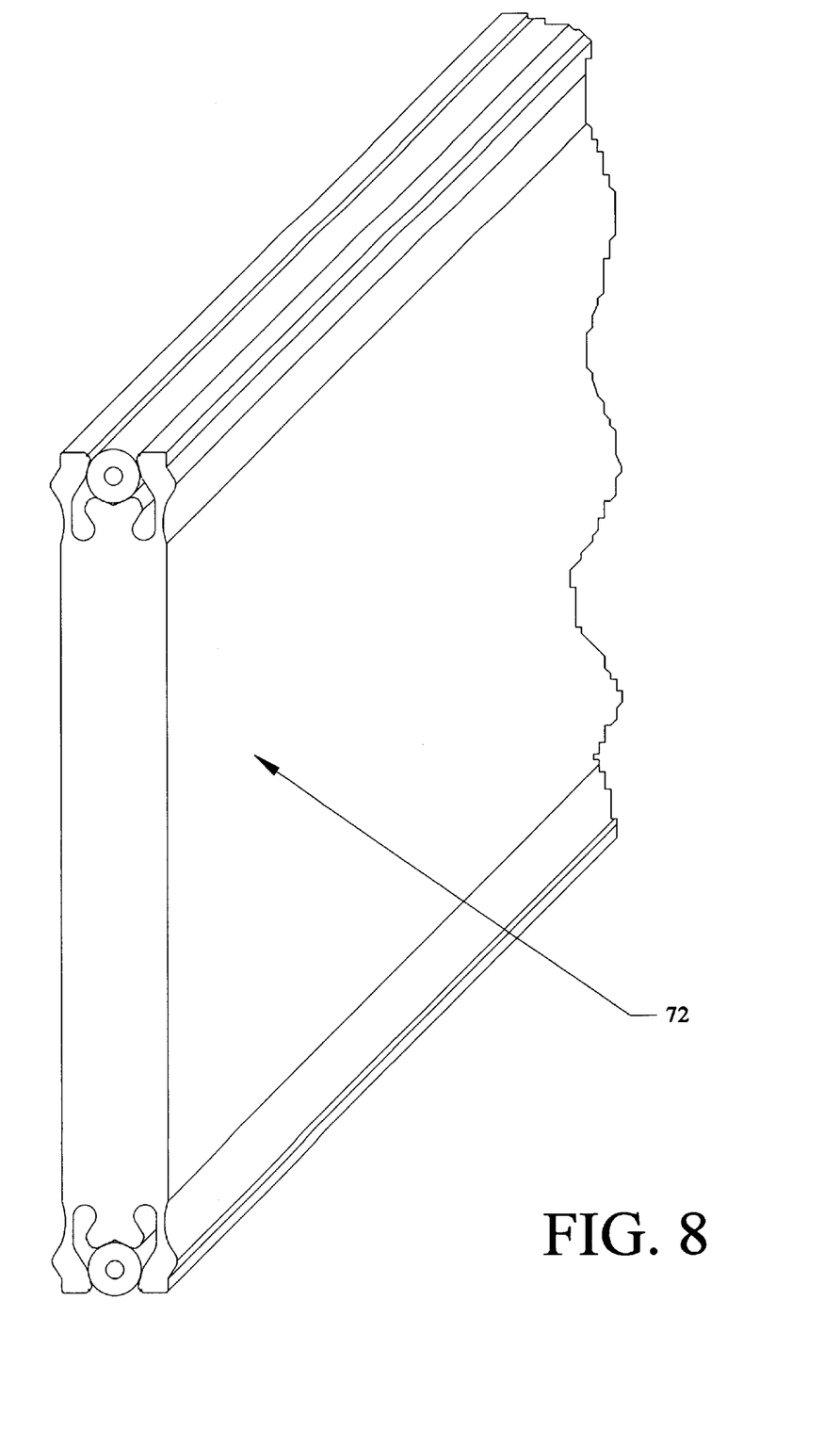
FIG. 8 is a perspective view of an elongated connector that can be used to connect two frame members a certain distance apart.

Yet another type of adapter I developed, shown in FIGS. 6 and 8, allows for the connection of multiple fastener structures to create complex framing structures. The adapter is an extension connector 70, 72 that has two first connector members separated by an extension that can provide short (FIG. 6) or long (FIG. 8) extensions between fastener structures. The extension connectors shown in FIGS. 6 and 8 are straight extensions. FIGS. 10–13 illustrate angled extensions 74, 76, 78, 80 for creating corners in framing structures. FIGS. 10–13 show angled extension of 60 degrees, 90 degrees, 120 degrees, and 135 degrees respectively for the most common types of angled extensions that can be used to create simple or complex framing structures. If necessary, various other angles can also be used.

Figure 14:
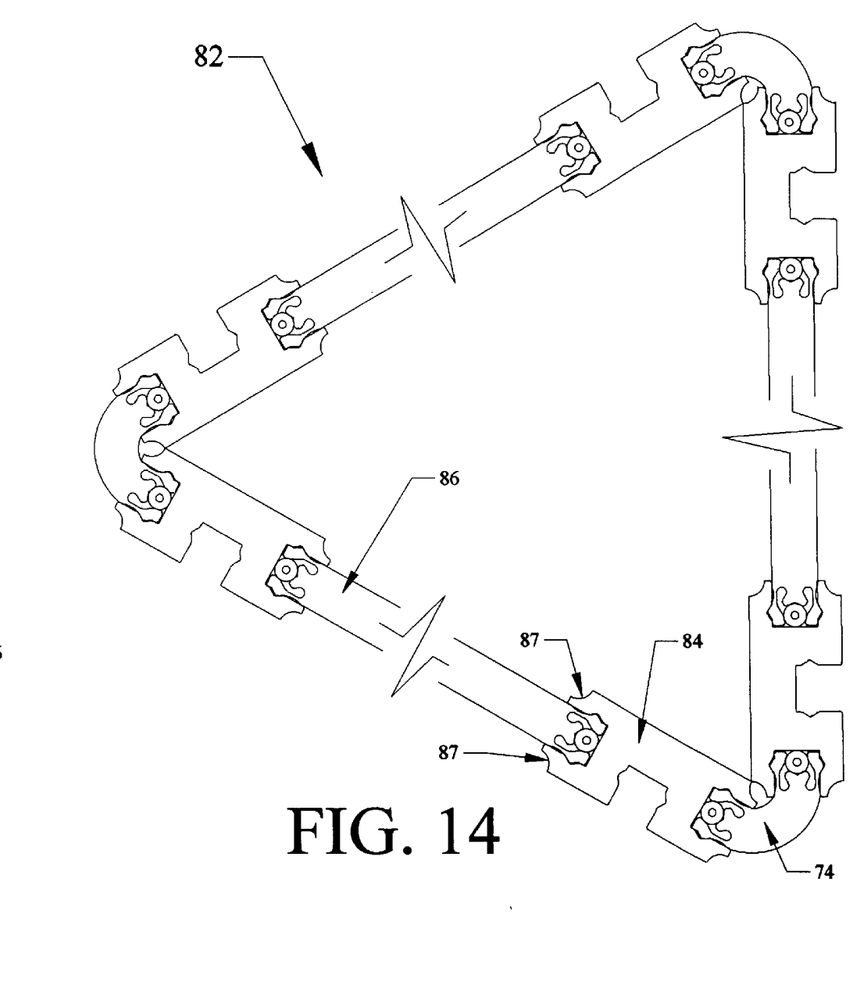
FIG. 14 is an end view illustrating one way in which some of my fastener structures can be joined together to create a specific structural design.
Figure 15:
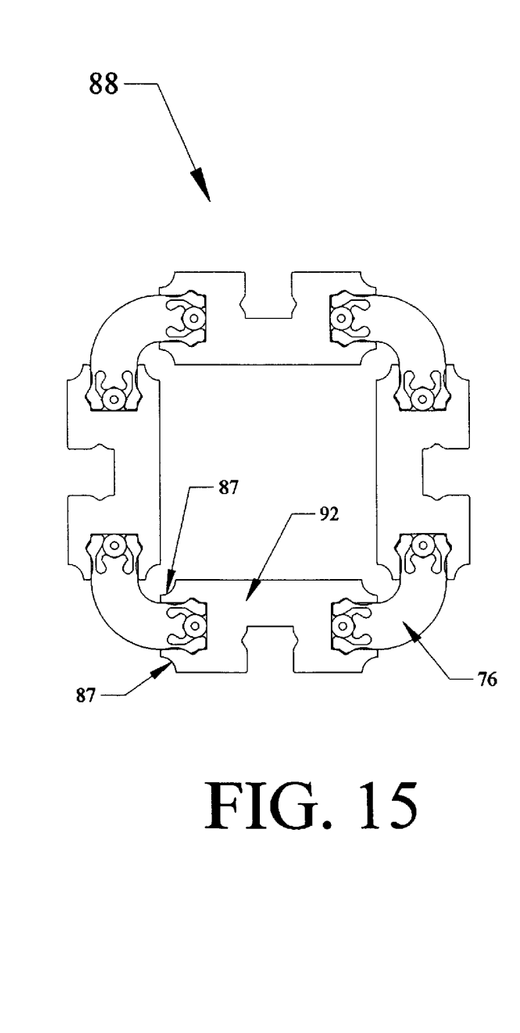
FIG. 15 is an end view illustrating another way in which some of my fastener structures can be joined together to create a specific structural design.

FIG. 14 illustrates a triangular framing structure 82 created using the 60 degree angled extensions 74 connected to second connector members 84 separated by straight extension connectors 86. To allow for more flexibility in connecting the connector members of the present invention, I have created notched areas 87 at the corners of the female connector members in order to create tightly angled connections without having interfering corners. FIG. 15 illustrates a square framing structure 88 created using the 90 degree angled extensions 76 connected with second connector members 92.

Figure 16:
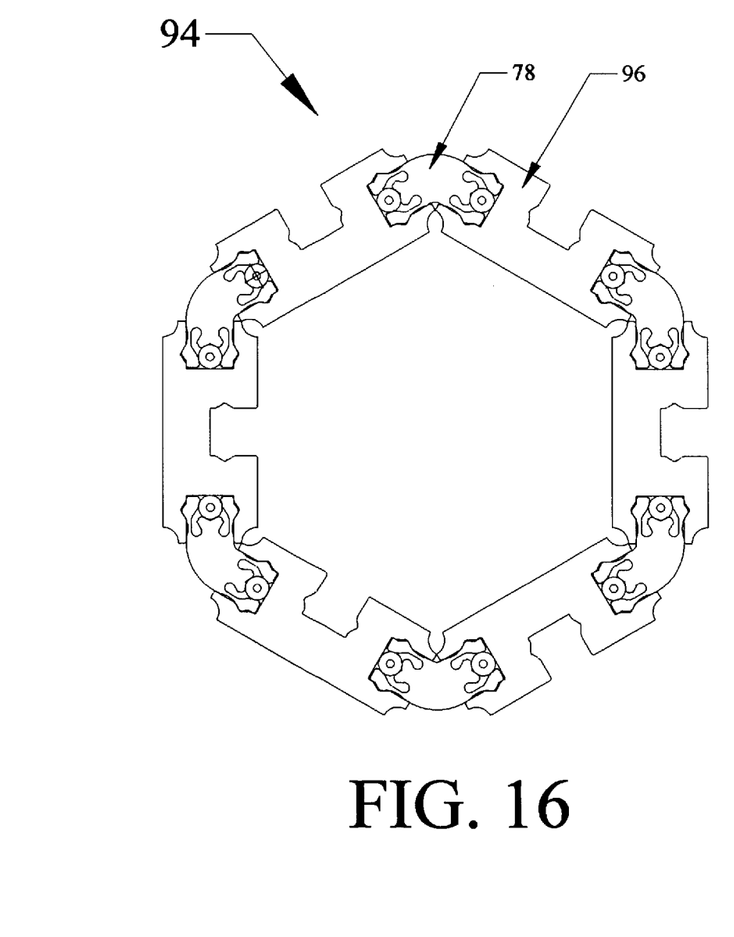
FIG. 16 is an end view illustrating yet another way in which some of my fastener structures can be joined together to create a specific structural design.
Figure 17:
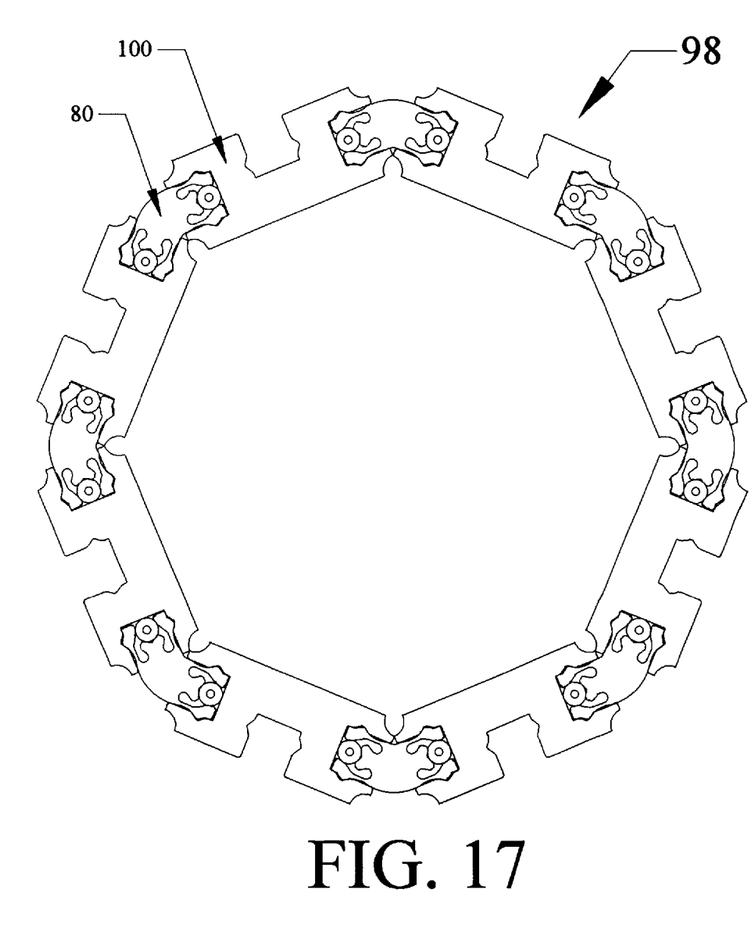
FIG. 17 is an end view illustrating still another way in which some of my fastener structures can be joined together to create a specific structural design.

FIG. 16 illustrates a hexagonal framing structure 94 created using the 120 degree angled extensions 78 connected with second connector members 96. FIG. 17 illustrates an octagonal framing structure 98 created using the 135 degree angled extensions 80 connected with second connector members 100.

Figure 18:
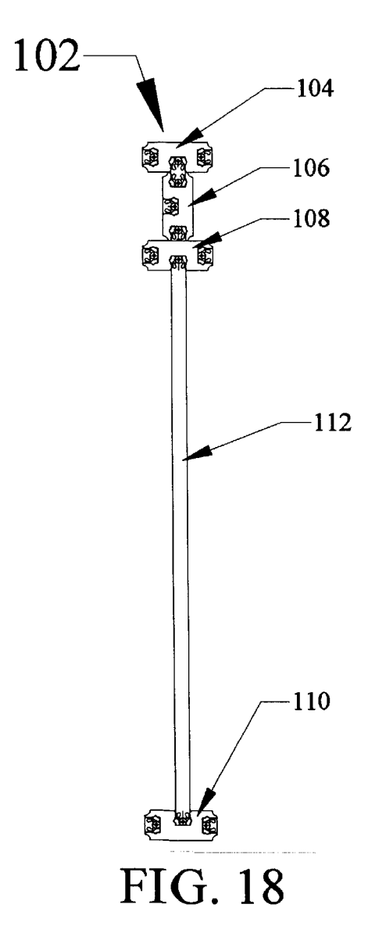
FIG. 18 is an end view illustrating the way in which some of my fastener structures can be joined together to create the assembled structural frame shown in FIG. 19.
Figure 19:
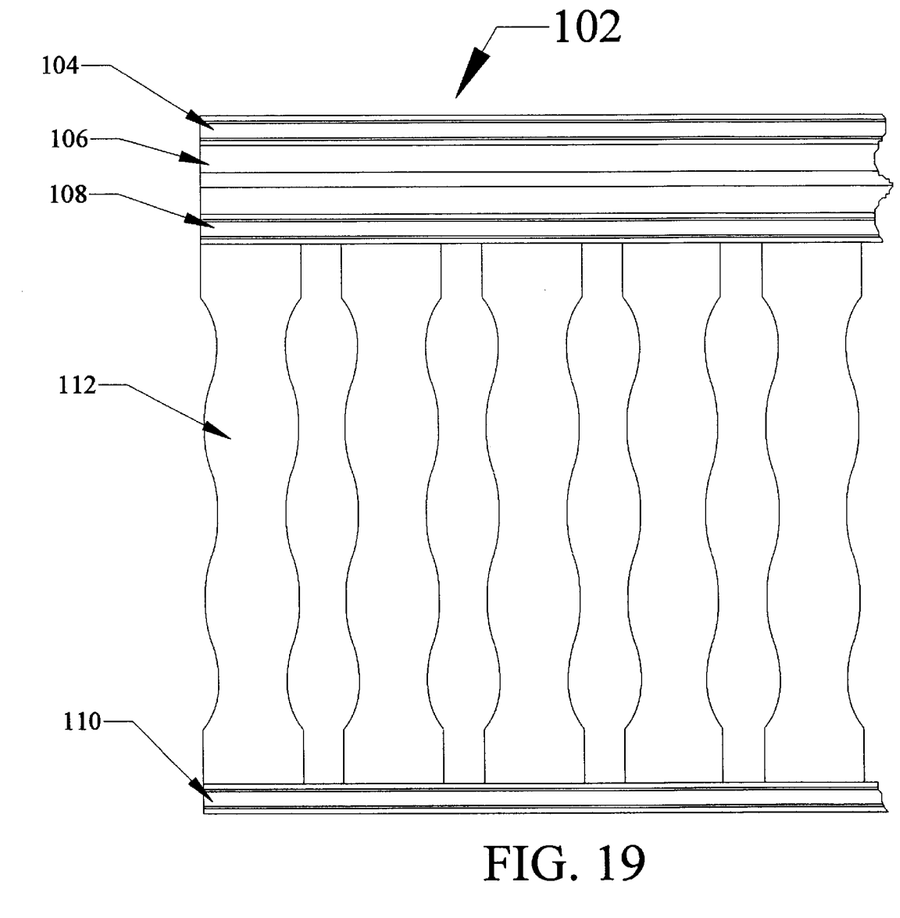
FIG. 19 is a front view of an assembled structure frame utilizing the fastener structures of my present invention.

FIGS. 18 and 19 further illustrate how a fence or railing structure 102 can be quickly and easily assembled using the connector members of the present invention. The upper rail members of the fence or railing structure is created by attaching three female connector members 104, 106, 108 together. The bottom rail is a female connector member 110. The fencing posts 112 are male extension connectors that extend between female connectors of the upper rail and the bottom rail.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A fastener structure comprising a first connector member and a second connector member, the second connector member having a slot for receiving said first connector member, the first connector member having a first pair of generally parallel, relatively stiff, yieldable legs which are spaced apart a distance substantially equivalent to a width of said slot, the slot having an open end defined by confronting spaced apart sidewalls, the yieldable legs having outwardly forming cam surfaces which are sized and shaped for camming engagement with said confronting spaced apart sidewalls, thus causing the yieldable legs to yield towards one another as said first connector member is pushed into the slot in said second connector member, the yieldable legs having oppositely facing locking abutments, the slot sidewalls having notched areas spaced inwardly from the open end of the slot for receiving said locking abutments to secure the yieldable legs in a secured fitted position in said slot with the yieldable legs being formed and shaped to exert forces to hold the locking abutments in said notched areas, and a lock key member being slideable longitudinally between said yieldable legs and being engageable with confronting inner faces of said yieldable legs to further secure said locking abutments of the yieldable legs in said notched areas.

2. The fastener structure of claim 1, wherein said first connector member, said second connector member, and said lock key member are made of an extruded material selected from the group consisting of: plastic and aluminum.

3. The fastener structure of claim 1, wherein said lock key member comprises a piece of flexible tubing, said flexible tubing allowing a user to insert a screw at one end in order to pull the flexible tubing out from in between the yieldable legs, said flexible tubing also being coilable in order to reduce the amount of space required to insert and remove the flexible tubing from in between the yieldable legs.

4. The fastener structure of claim 1, wherein said second connector member is a structural frame member having a generally rectangular shape.

5. The fastener structure of claim 1, wherein said second connector member contains at least one slot on its perimeter extending along the length of the second connector member.

6. The fastener structure of claim 1, wherein said first connector member further includes a filler means, said filler means being positioned at an upper portion between the yieldable legs, said filler means having a flat outer surface, wherein said flat outer surface is sized to be flush with an outer surface of the second connector member adjacent the slot when said first connector member is positioned within the slot of the second connector member and said lock key member is positioned in between the yieldable legs.

7. The fastener structure of claim 1, wherein said first connector member further includes an adapter means, said adapter means being positioned at an upper portion between the yieldable legs, said adapter means having at least one groove extending along the length of the first connector member on an outer portion thereof, wherein said at least one groove can be used to hold at least one piece of material in place.

8. The fastener structure of claim 1, wherein said first connector member further includes an extension means, said extension means being positioned at an upper portion between the first pair of yieldable legs and extending outwardly away from the yieldable legs, said extension means having a second pair of generally parallel, relatively stiff, yieldable legs at an opposite end of the first connector member, said second pair of yieldable legs being sized and shaped similarly to said first pair of yieldable legs, wherein said second pair of yieldable legs allow for connection to a third connector member having a slot for receiving the second pair of yieldable legs.

9. The fastener structure of claim 8, wherein said extension means is angled between 0 degrees and 120 degrees relative to a vertical axis of the first pair of yieldable legs.

10. The fastener structure of claim 1, wherein the first connector member further includes a channel, said channel being centrally located at an upper portion in between the yieldable legs, whereby said channel acts as a guide for inserting the lock key member as well as providing a marked area of an axially center portion of the first connector member.

11. A method for connecting at least two connector members together, comprising the steps of:

a) providing a first connector member, the first connector member having a pair of generally parallel, relatively stiff, yieldable legs;

b) providing a second connector member having a slot for receiving the first connector member, the yieldable legs of the first connector member being spaced apart a distance substantially equivalent to a width of the slot, the slot having an open end defined by confronting spaced apart sidewalls, the yieldable legs having outwardly forming cam surfaces which are sized and shaped for camming engagement with the confronting spaced apart sidewalls, the yieldable legs having oppositely facing locking abutments, the slot sidewalls having notched areas spaced inwardly from the open end of the slot for receiving the locking abutments;

c) pushing the first connector member into the slot of the second connector member, thus causing the yieldable legs to initially yield towards one another as the first connector member is pushed into the slot in the second connector member and then causing the locking abutments to enter the notched areas, wherein the yieldable legs are formed and shaped to exert forces to hold the locking abutments in the notched areas;

d) providing a lock key member sized to securely fit in between the pair of yieldable legs of the first connector member; and e) sliding the lock key member longitudinally between the yieldable legs, wherein the lock key member is sized to be in engagement with confronting inner faces of the yieldable legs to further secure the locking abutments of the yieldable legs in the notched areas, and thereby connecting at least two connector members together.

* * * * *